United States Patent [19]
Adli

[11] Patent Number: 6,044,924
[45] Date of Patent: Apr. 4, 2000

[54] HOT COMPRESSED GAS POWERED VEHICLE

[76] Inventor: Manoucher Adli, 6715 Avenida Andorra, La Jolla, Calif. 92037

[21] Appl. No.: 08/740,860

[22] Filed: Nov. 4, 1996

[51] Int. Cl.[7] ..................................................... B60K 3/00
[52] U.S. Cl. .............................. 180/302; 180/242; 293/20
[58] Field of Search .................................... 180/242, 274, 180/65.2, 65.3, 302, 165; 293/20; 60/508, 512, 659, 408, 414, 416; 244/53 R, 55

[56] References Cited

U.S. PATENT DOCUMENTS

| | | | |
|---|---|---|---|
| 453,768 | 6/1891 | De Puy | 293/20 |
| 3,861,623 | 1/1975 | Fruechte | 244/53 R |
| 3,925,984 | 12/1975 | Holleyman | 180/302 |
| 4,043,126 | 8/1977 | Santos | 180/302 |
| 4,163,367 | 8/1979 | Yeh | 180/302 |
| 4,228,654 | 10/1980 | Hill | 60/508 |
| 4,355,508 | 10/1982 | Blenke et al. | 180/302 |
| 4,361,204 | 11/1982 | Earle | 180/302 |
| 4,370,857 | 2/1983 | Miller | 180/302 |
| 4,383,589 | 5/1983 | Fox | 180/302 |
| 4,478,304 | 10/1984 | Delano | 180/302 |
| 4,480,709 | 11/1984 | Commanda | 180/65.3 |
| 4,605,185 | 8/1986 | Reyes | 244/55 |
| 5,294,191 | 3/1994 | Giorgetti et al. | 180/165 |
| 5,337,560 | 8/1994 | Abdelmalek | 180/65.3 |
| 5,353,889 | 11/1994 | Hamada | 180/242 |
| 5,465,806 | 11/1995 | Higasa et al. | 180/165 |

FOREIGN PATENT DOCUMENTS

93/14968  8/1993  WIPO ........................................ 293/20

*Primary Examiner*—J J Swann
*Assistant Examiner*—Frank Vanaman
*Attorney, Agent, or Firm*—Frank D. Gilliam

[57] ABSTRACT

An air powered drive system for a vehicle such as an automobile or a propeller driven aircraft. In a land vehicle air pumps are connected to drive, or be driven by, each wheel. At least two air storage tanks are connected to the air pumps. A fuel is burned in one tank to provide hot, high pressure air that can be directed to selected air pumps to drive associated wheels. Meanwhile, other air pumps connected to a cool, lower pressure tank are driven by an associated wheels to act as an air compressor to compress cool ambient air in the tank. When air pressure in the heated tank drops, combustion is shut off there and begun in the other tank and the driving and filling tanks and pumps are reversed. Similarly, two such tanks are connected through air pumps to an aircraft propeller shaft. Alternately, on tank is heated to produce hot, high pressure air to drive one air pump while the other air pump is driven by the shaft to compress air in the cooler tank. When pressure in the heated tank decreases, tank operation is reversed. In the land vehicle version, additional energy can be saved during braking and through small pumps connected to shock absorbers. Also, a roller mounted band can be provided around the vehicle to reduce collision damage.

5 Claims, 3 Drawing Sheets

HOT COMPRESSED GAS POWERED VEHICLE

FIELD OF THE INVENTION

This invention relates to apparatus for powering a vehicle capable of carrying people, cargo, etc. in which the motive energy is derived from compressed air.

BACKGROUND OF THE INVENTION

While most land vehicles, such as automobiles, trucks, etc. and many light aircraft are powered by internal combustion engines, a number of other drive systems have been proposed. These include gas turbine engines, steam engines, electric battery power, etc. and combinations of these systems. Because of the high state of development of the internal combustion engine and the low efficiency, short range and other problems, none of these alternative systems have come into widespread use.

Today, with increasing environmental awareness and increasing efforts to reduce pollution, greater attention is being given to drive systems which produce less air pollution than internal combustion engines. Also, internal combustion engines are not fully efficient, wasting considerable amounts of energy in the form of heat that must be passed to the atmosphere though a radiator and exhaust system.

A number of different compressed air powered vehicles have been developed, either fully powered by compressed air or as an assist system to supplement an internal combustion engine. Compressed air drive is quiet, generally has few objectionable emissions and can recover energy wasted during braking and emit little waste heat energy.

Typical air assist or hybrid systems are described by Ellison in U.S. Pat. No. 4,123,910. An air compressor is powered by a main, internal combustion, engine. The internal combustion engine is used when speeds are in the range in which that engine is most efficient. During driving under conditions in which the main engine is inefficient, such as stop-and-go urban driving, the compressed air powers the same drive train with the main engine turned off. While improving efficiency under limited conditions, this system still has most of the disadvantages of the internal combustion engine and is very heavy, requiring both internal combustion and air drive system, reducing efficiency.

Another hybrid system, requiring an electric motor and flywheel drive for an air compressor is described by Yeh in U.S. Pat. No. 4,163,367, and has similar problems with weight and complexity. Other hybrid combinations of an internal combustion engine or battery for compressing air are described by Gardner in U.S. Pat. Nos. 4,590,767 and 4,753,078 and have the same weight and efficiency problems.

An auxiliary system for using braking energy to compress air to supplement a main engine is described by Lowther in U.S. Pat. No. 4,290,268. A similar system is described by Chang in U.S. Pat. No. 4,798,053. Again, as merely a supplement to a main engine, the weight, complexity and cost of the auxiliary system is not generally justified by any efficiency increases.

In U.S. Pat. No. 4,383,589 Fox describes a system using a drive system for each wheel consisting of a motor powered by compressed air from a tank. A compressor is connected to each wheel to feed compressed air to the tank. Since no source of energy is furnished to replenish energy lost to friction in the system, the tank will quickly run out of air. Even if the tank were filled before beginning a drive, the vehicle would have an extremely short range.

Thus, there is a continuing need for improved vehicle drive systems that are more energy efficient, produce less pollution, transfer power to the motive means in a less complex, lighter weight and more effective manner and recover and use energy dissipated during breaking and coasting.

SUMMARY OF THE INVENTION

The above noted problems, and others, are overcome in accordance with this invention by an air pressure powered system which, basically, comprises two pressurized air storage tanks, at least two air motors connected to said tanks, at least one connected to each of said two tanks, transmission means for connecting said air motors to vehicle drive means, such as land engaging wheels for a land vehicle or a propeller for an aircraft, means for directing air from the tank with higher pressure to at least one first air motor to power the vehicle, means for driving at least one second air motor to serve as a compressor to direct compressed air to the tank with lower pressure and means for burning a fuel in the first tank to further raise pressure therein. The energy difference between the higher pressure, hotter, air in the first tank (driving the vehicle) and the lower pressure, cooler, air in the second tank causes the driven wheel to move the vehicle.

In a land vehicle, typically each tank is connected through a set of two conventional air motors and two wheels. Higher pressure air passes through its set of two air motors to drive the associated two wheels through a suitable transmission. Meanwhile, the second set of wheels is driving the corresponding air motors acting as compressors to store pressurized air in the second tank. When the pressure in the warmer first tank falls to that in the cooler second tank, the system is reversed. The first set of wheels drive the first set of air motors to force cool air into that tank. Combustion of fuel begins in the second tank, raising the pressure and causing the second set of air motors to drive the second set of wheels, propelling the vehicle.

When the vehicle is coasting down hill or when braking is desired, no air will need to be sent to the propelling wheels. All of the wheels can drive the air pumps acting as compressors to direct air into both tanks. Because of the back pressure the wheels driving the compressor, a braking effect will occur, which can be increased by varying the gearing between wheels and compressing air pumps. Thus, braking energy can be recovered and serves to help fill the tanks. Braking forces will be greatest on the wheels driving air pumps forcing air into the higher pressure tank. If desired, fuel combustion in the higher pressure tank can be reduced or stopped during a long downhill run or extensive braking.

In a second embodiment, a first air pump can be connected to a first tank and to a propeller shaft through a suitable transmission. A second air pump is connected to a second tank and to the propeller shaft through another transmission. High pressure in one tank, due to fuel combustion in the tank, will cause the associated pair pump to drive the propeller. The second air pump will act as a compressor, taking energy from the propeller shaft to pump air into the lower pressure, cooler, other tank.

Further energy can be conserved, and air added to a tank, by connecting a reciprocating air pump to vehicle springs, shock absorbers, etc. The pump is similar to a conventional bicycle pump having a sliding piston on a shaft in a closed tube with one-way intake and outlet valves on opposite sides of the piston. The pump shaft is connected to a reciprocating vehicle part such as a spring or shock absorber so that the pump shaft correspondingly reciprocates, forcing air into a tank through a tube between pump outlet valve and a tank.

In the event of a collision, a large air tank at front and back ends of a vehicle will serve as significant collision energy absorbers. In addition, the ends of the vehicle can be generally pointed and the vehicle can have a continuous belt around the vehicle in a horizontal plane, mounted on a plurality of vertical rollers. In a low speed collision at an angle to the vehicle, the colliding vehicle will cause the belt to move along the mounting vehicle surface, causing the colliding vehicle to slide along the surface and do less damage.

BRIEF DESCRIPTION OF THE DRAWING

Details of the invention, and of preferred embodiments thereof, will be further understood upon reference to the drawing, wherein.

DETAILED DESCRIPTION OF PREFERRED MODES

Figure 1:
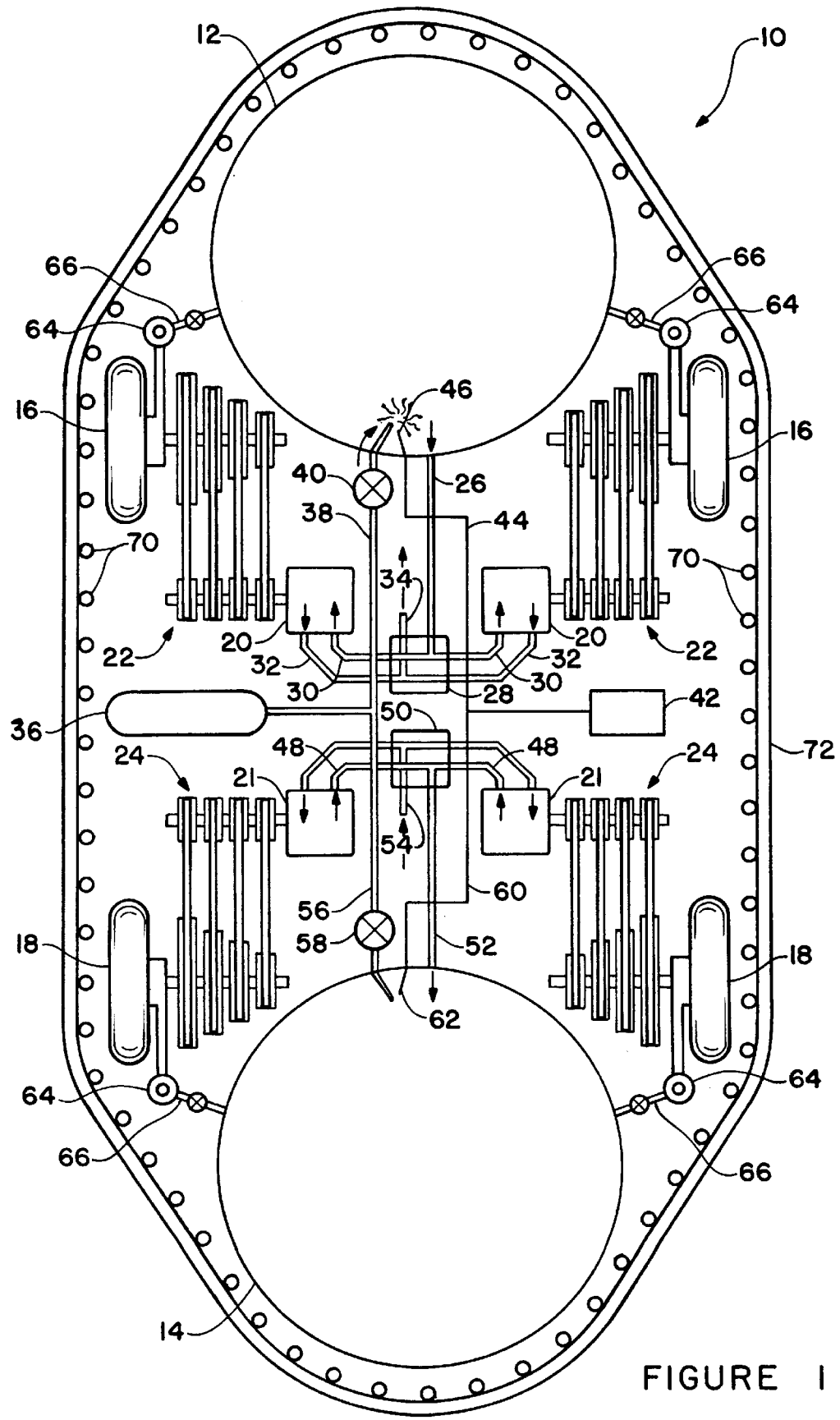
FIG. 1 is a schematic plan view of the air powered drive system of this invention during powered movement.
Figure 2:
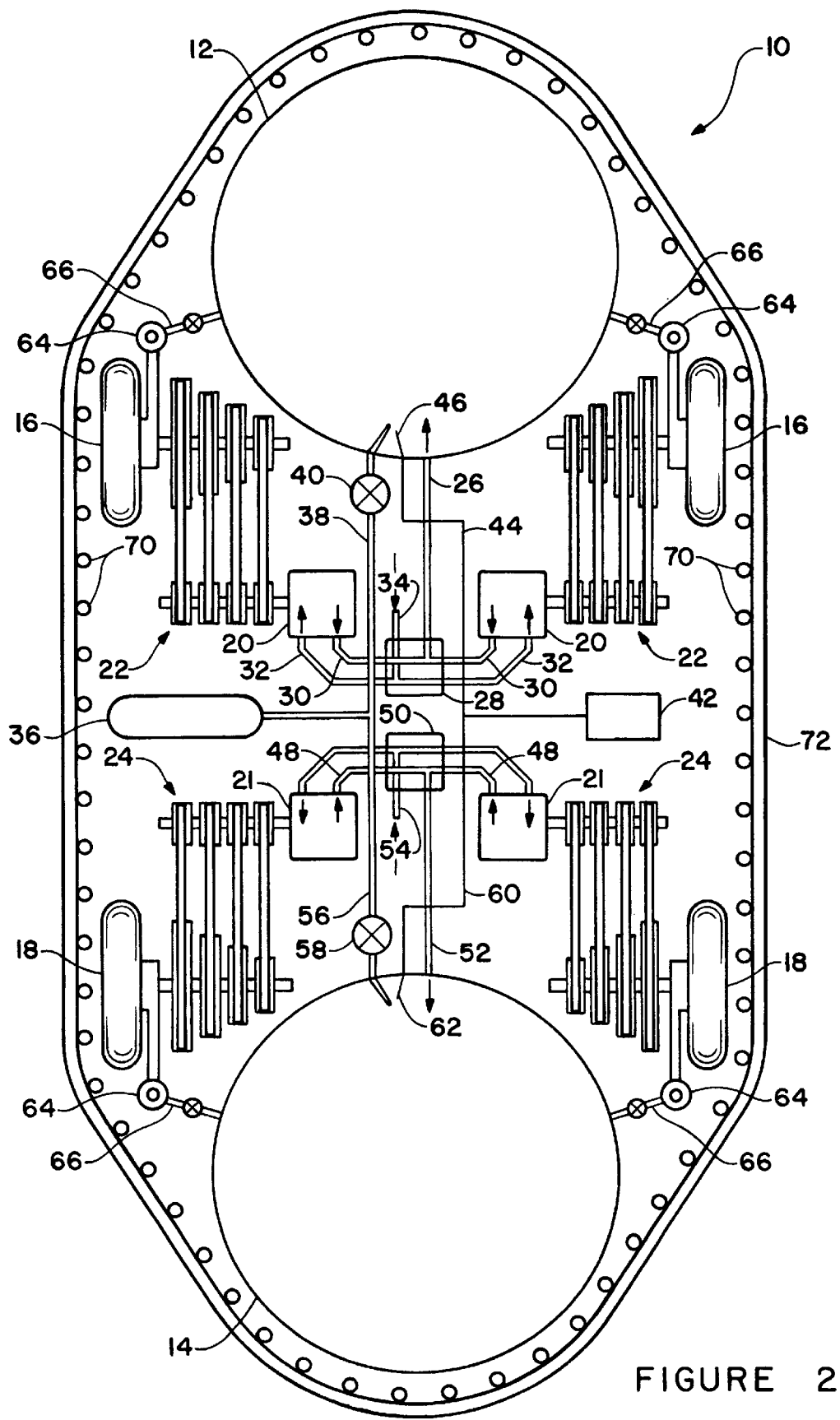
FIG. 2 is a schematic plan view of the air powered drive system in during braking.
Figure 3:
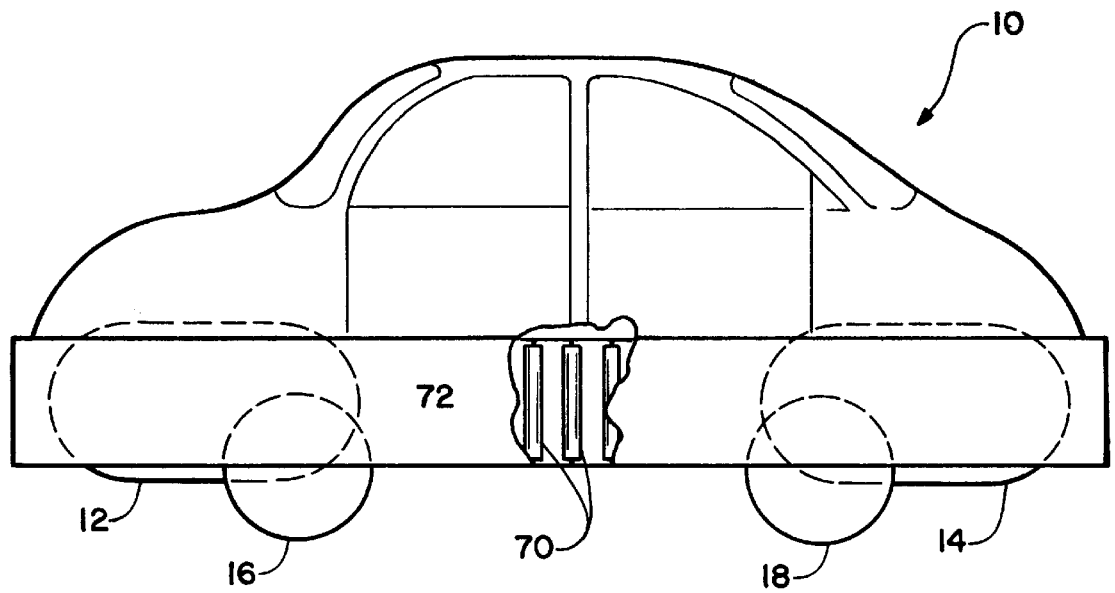
FIG. 3 is a side elevation view of the vehicle.

Referring to FIGS. 1–3 which show schematic plan views of the system in the power and braking portions of the operating cycle, there is seen a road vehicle 10, such as a passenger automobile, truck or the like.

Two independent air tanks 12 and 14 are provided. While the positions shown are preferred since they provide energy absorbing structures in the event of a collision at either the front or back end of the vehicle, the tanks may have any suitable shape and can be located in any suitable position. Typically, tanks 12 and 14 can accommodate 120 to 400 psi pressure and can be formed from any suitable material, such as steel, aluminum, titanium, fiber reinforced plastics, such as carbon fibers in a resin matrix, etc.

Vehicle 10 is supported on a plurality of conventional wheels here four wheels including two forward wheels 16 and two aft wheels 18. Each forward wheel 16 is driven by an air motor 20 through a variable speed transmission 22. Similarly, each aft wheel 18 is driven through a variable speed transmission 24. While each transmission 22 and 24 is illustrated as a conventional belt and pulley transmission, with different belts selectively engaged to pulleys of different diameters to vary speed, any other conventional transmission, such as a fluid drive, variable gears of the sort used in multi-speed bicycles, etc.

If desired, air motors such as those shown by Lowther in U.S. Pat. No. 4,290,268 may be used. Those air motors have variable air chambers within the air motors so that the drive ratio between the drive motors and wheels can be changed directly and the transmissions between air motor and wheel can be eliminated.

Vehicle 10 is alternately powered by high pressure air from one of tanks 12 and 14 while the other tank is being pressurized. In the state shown in FIG. 1, air tank 12 contains the high pressure air, which flows through conduit 26 to a conventional valve manifold 28 which directs the high pressure air to air motors 20 through conduits 30 to drive wheels 16 through transmissions 22. Air exhausted from air motors 20 passes through conduit 32 to manifold 28 and is exhausted to the atmosphere through conduit 34.

In order to heat the air in tank 12 and thereby raise the pressure, fuel such as propane or any other suitable combustible gas or liquid passes from a fuel tank 36 through conduit 38 and conventional controller 40. Electrical energy to ignite the fuel passes from battery 42 through wire 44 to a conventional spark plug, glow plug or other igniting means 46. Controller 40 is a conventional combination of fuel valve and ignition control While hot, high pressure, air from tank 12 is thus being used to drive air motors 20 and power wheels 16 the air in tank 14 is being replenished.

The air in tank 14 is cooled, since no combustion is taking place in that tank. Wheels 18 are driving air motors 21 through transmissions 24 to act as air compressors, directing compressed air through conduits 48, manifold 50 and conduits 52 to fill tank 14 with cool atmospheric air entering the air motors 21 through intake conduit 54.

When enough sufficient hot, high pressure air from tank 12 has been used so that pressure in tank 12 that the pressure has dropped to about equal the pressure of cold air in tank 14, fuel combustion in tank 12 is stopped and combustion is initiated in tank 14, with fuel introduced through conduit 56 and controller 58 and ignition current passing from battery 42 through wire 60 to a spark plug 62 or the like, as detailed above. Fuel combustion in tank 14 rapidly increases the air pressure, which is used to drive air motors 21 as described above and air motors 20 begin to refill tank 12 with cool atmospheric air.

Thus, this sequence of powering the vehicle through hot, high pressure air from one tank while refilling the other tank with cool atmospheric air continues as the vehicle is moving along a roadway.

FIG. 2 illustrates the system of FIG. 1 during braking or downhill coasting. A conventional braking actuator (not seen) such as a pedal, knob or the like is operated to initiate braking. Immediately, combustion in the powering tank is turned off and both air motors are controlled to act as air pumps to direct outside air into both tanks, increasing pressure therein. If desired, especially where the high pressure tank is near the low end of the high pressure, powering, range, ignition can be continued in that tank to help build up pressure.

Where the vehicle is coasting, such as down a long hill, conventional sensor connected to a conventional throttle control will similarly cause all of the air motors to act as compressors as in the described braking sequence. This will also have a downhill braking effect, so that excessive downhill speed will be avoided.

As seen in FIG. 2, during braking and coasting air flow in each air motor 20 and 21 all exhaust/inlet conduit openings 34 and 54 will act as intakes, passing air through 32 and 46, air pumps 20 and 21 and fill conduits 26 and 52 to tanks 12 and 14, respectively. Meanwhile, delivery of fuel from tank 36 and conduits 40 and 56 and ignition at igniters 46 and 62 will be interrupted.

When the vehicle is stopped, air motors 20 and 21 will, of course not be operating. Fuel delivery and combustion will be stopped. Thus, no energy will be consumed while the vehicle is stopped, even for short periods, such as at a traffic light.

When starting up after a long inactive period, for example a week or more, combustion-will be started on one tank to raise the pressure. Once sufficient pressure is generated, the vehicle can begin moving and the sequence describe above will begin, with more frequent switching between tanks until full pressure is developed.

In conventional vehicles, energy is wasted in the braking, spring and shock absorber systems. Energy absorbed by these systems is simply dissipated into the atmosphere as heat. The braking system described above will recycle braking energy. Energy from the spring and shock absorbers can be recovered by simply connecting small one-way linear piston-in-shaft air pumps 64, similar to conventional hand bicycle type pumps, to suitable springs and shock absorber points. As the spring or shock absorber goes up and down, the pump 64 piston will move correspondingly. The output air from these pumps can be directed through conduits 66 to air tanks 12 and 14.

Vehicle 10 includes several features that aid in protecting passengers from injury in the event of a collision. As mentioned above, air tanks 12 and 14 can be positioned at locations where they can absorb impact energy. The tanks will, of course, be designed to rupture in a manner rapidly releasing the contained pressurized air in a safe manner, in the same manner as pressured natural gas vehicle fuel tanks are designed.

A series of spaced vertically disposed, low friction, rollers 70 are arranged around the vehicle exterior. A continuous belt 72, typically of a flexible elastomeric material is mounted on rollers 70, as seen in FIGS. 1 and 3. If vehicle 10 should collide at a low angle to another vehicle or object, considerable energy will be absorbed by the belt which will move with the colliding object. Further, the belt will aid in deflecting the colliding object, allowing the vehicle and other object to strike a glancing blow and move past each other, rather that having the two imbedded into each other so that all energy must be absorbed by crushing structures.

Figure 4:
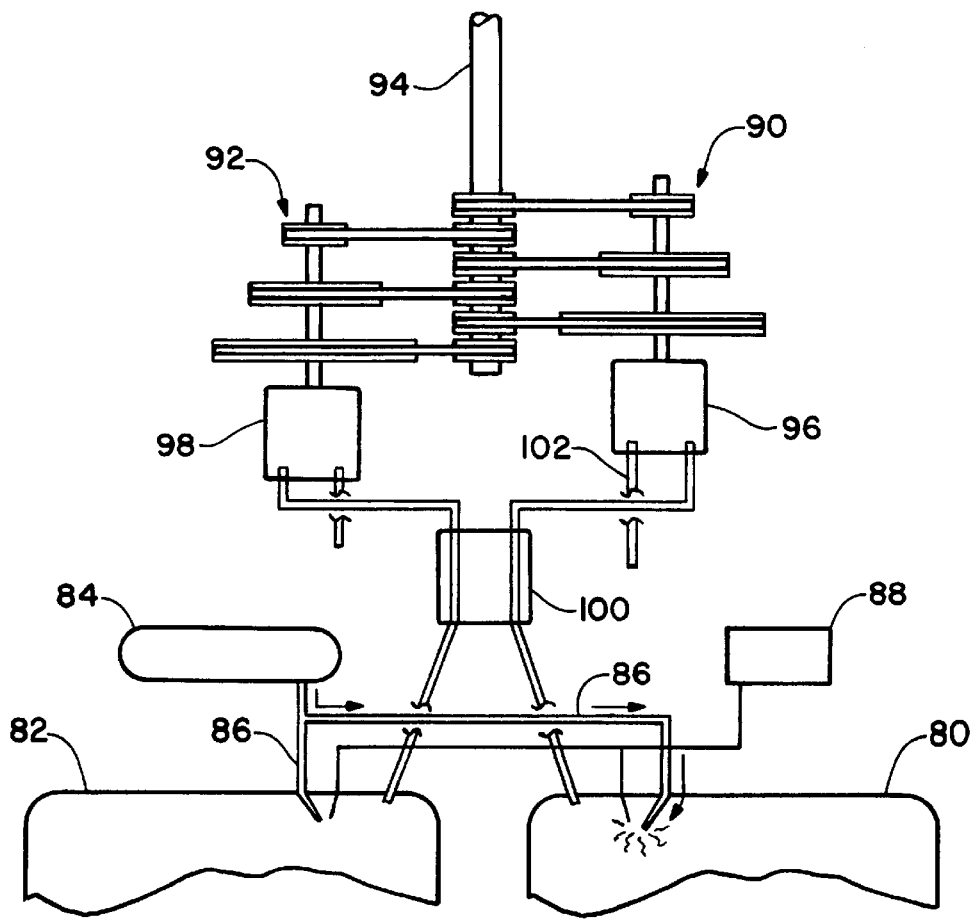
FIG. 4 is a schematic plan view of an air powered drive system for use in driving an airplane propeller.

An embodiment of the air pressure drive system suitable for driving an aircraft propeller or other similar rotating shaft is schematically illustrated in FIG. 4. This embodiment includes two air tanks 80 and 82, a fuel supply 84, conduits 86 for supplying fuel to either tank 80 or 82 and a combustion system supplied by battery 88, all operating in the manner described above.

Two variable speed pulley transmissions 90 and 92 are connected to an aircraft propeller shaft 94, both for driving the shaft in the same direction. Air motors 96 and 98 are connected to transmissions 90 and 92, respectively.

Air motor 96 is receiving air from the higher pressure tank, tank 80 as illustrated. At the same time, transmission 92 is being driven by propeller shaft 94 to operate air motor 98 as an air compressor. A manifold 100 connects air pump 96 to tank 80 and air pump 98 tank 82. In the state illustrated, hot, high pressure air from tank 80 passes to air pump 96 to drive transmission 90 and shaft 94, with air exhausted to the atmosphere through connection 102, now acting as an exhaust outlet. Meanwhile, air pump 98 is being operated as a compressor, driven by shaft 94 and transmission 92 to take in air through connection 104, now acting as an inlet. This cool air is directed to cool, low pressure tank 82.

When air pressure in hot, high pressure tank 80 drops to about the pressure in cool, lower pressure tank 82, the systems is switched, with fuel combustion stopped in tank 80 and initiated in tank 82. Pressure in tank 82 rapidly rises and begins to operate air pump 98 to drive shaft 94 through transmission 92. Meanwhile, air pump 96 begins to operate as an air compressor, directing cool atmospheric air into tank 80 and the cycle continues.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. An air powered drive system for a vehicle which comprises:

vehicle propelling means comprising a plurality of wheels for engaging the earth's surface and individual independent variable speed transmission means connected to each of said wheels;

first air pump means connected to said vehicle propelling means for alternately driving said vehicle propelling means and being driven by said vehicle propelling means;

a first air storage tank;

conduit means for conveying air from said first air storage tank to said first air pump means to drive said vehicle propelling means and for conveying air from said first air pump means to said first air storage tank;

second air pump means connected to said vehicle propelling means for alternately driving said vehicle propelling means and being driven by said vehicle propelling means;

a second air storage tank;

conduit means for conveying air from said second air storage tank to said second air pump means to drive said vehicle propelling means and for conveying air from said second air pump means to said second air storage tank;

fuel combustion means in each of said first and second tanks for substantially uniformly heating the entire air supply in each of said first and second tanks prior to air exiting said first and second tanks;

control means for causing combustion of fuel in one of said tanks for raising pressure therein, for directing air from a resulting higher pressure tank to one of said first and second air pump means for driving said air pump to drive said vehicle propelling means and for directing air from another of said first and second air pump means to a resulting lower pressure tank to compress air therein and a spaced parallel array of rollers around the periphery of said vehicle and a belt supported by said rollers for movement along said rollers.

2. The air powered drive system according to claim 1 wherein said vehicle includes four wheels and includes a separate air pump for alternately driving and being driven by each of said wheels through said transmission means.

3. An air powered drive system for a land vehicle which comprises:

vehicle propelling means comprising a plurality of wheels for engaging the earth;

air pump means connected to each of at least two of said wheels for alternately driving one of said wheels and being driven by another of said wheels;

at least two air storage tanks;

variable speed transmission means between each of said wheels and said air pump connected thereto;

conduit means for conveying air from one of said air storage tanks to one of said air pump means and for conveying air from another one of said air pump means to another one of said air storage tanks;

fuel combustion means in each of said air storage tanks for causing combustion of fuel in said air storage tanks for substantially uniformly raising temperature and pressure therein;

control means for operating said combustion means in predetermined ones of said air storage tanks;

conduit means for directing air from a resulting higher pressure tank in which said combustion means is operated to at least one air pump means for driving said air pump to drive said connected wheel;

conduit means for directing air from at least one air pump means to air storage tanks in which said combustion is not operated to compress air therein.

4. The air powered drive system according to claim 3 wherein said vehicle is a wheel mounted land vehicle which further includes a spaced parallel array of rollers around the periphery of said vehicle and a belt supported by said rollers for movement along said rollers.

5. An air powered drive system for a propeller drive aircraft which comprises:

a propeller shaft for mounting a propeller;

first and second air pump means connected to said propeller shaft for alternately driving said propeller shaft and being driven by said propeller shaft;

first and second air storage tanks associated with said first and second air pump means, respectively;

conduit means for conveying air between said first storage tank and said first air pump means and for conveying air between said second air pump means and said second air storage tank;

fuel combustion means in each of said first and second air storage tanks;

means for causing combustion of fuel in one of said tanks for raising pressure therein;

means for directing the resulting higher temperature, higher pressure air to an associated air pump means for driving said air pump to drive said propeller shaft;

means for directing air from the other air pump means to the associated air storage tank to compress air therein.

* * * * *